May 2, 1967  C. W. VOGELGESANG  3,316,774
ADJUSTABLE STEERING COLUMN

Filed July 12, 1965  4 Sheets-Sheet 1

INVENTOR.
CHARLES W. VOGELGESANG
BY
*William N. Antonis*
ATTORNEY

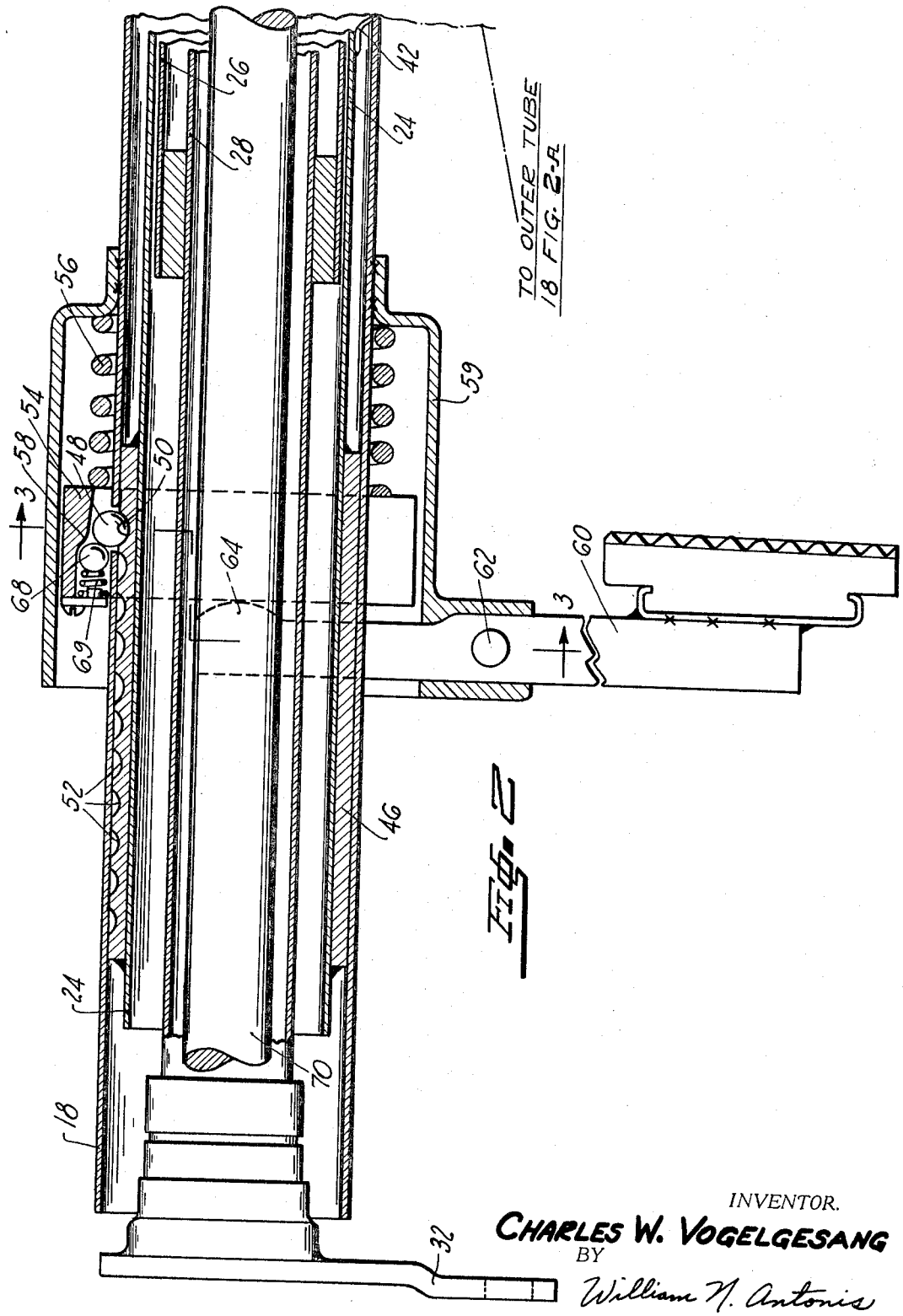

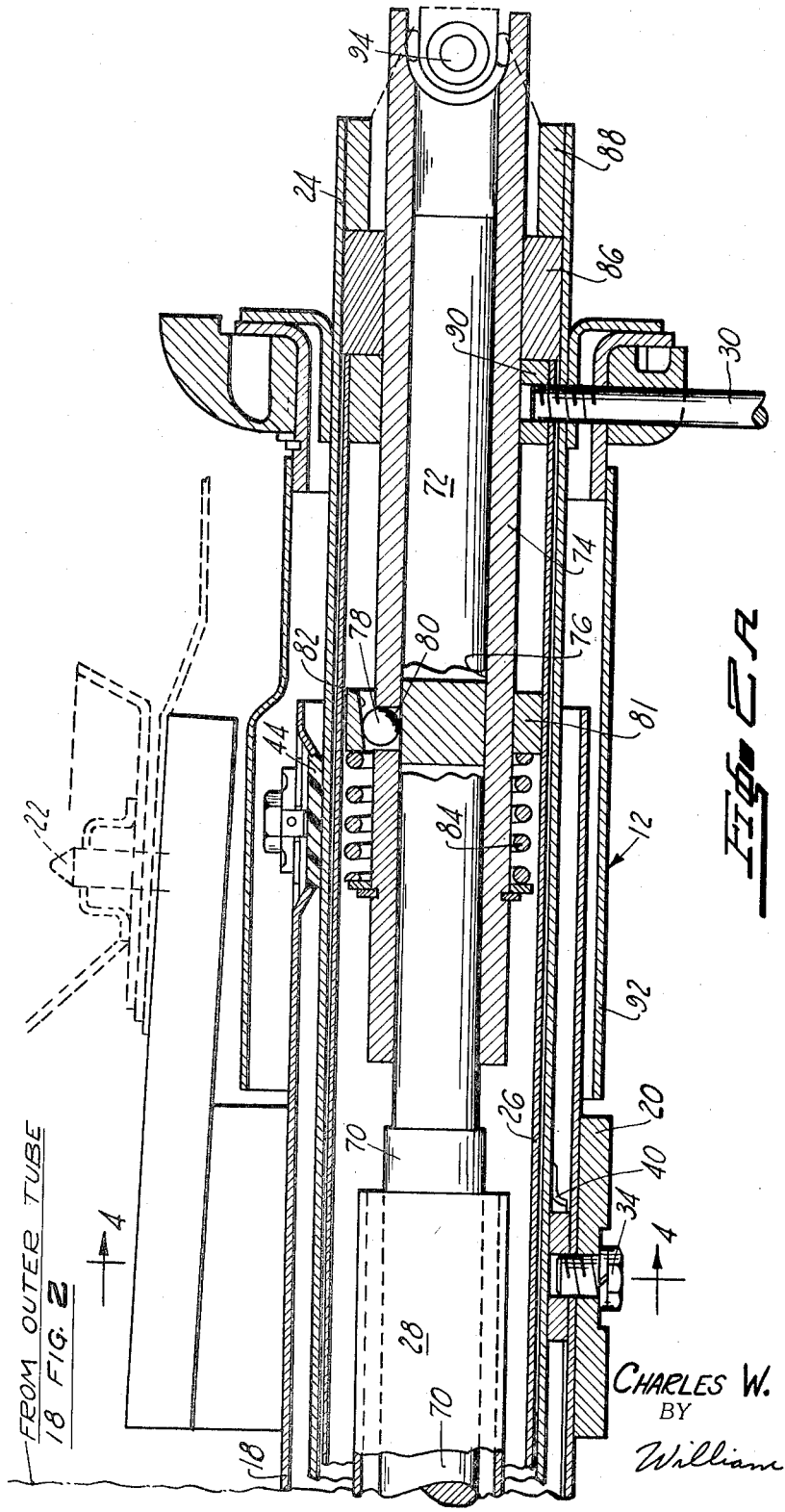

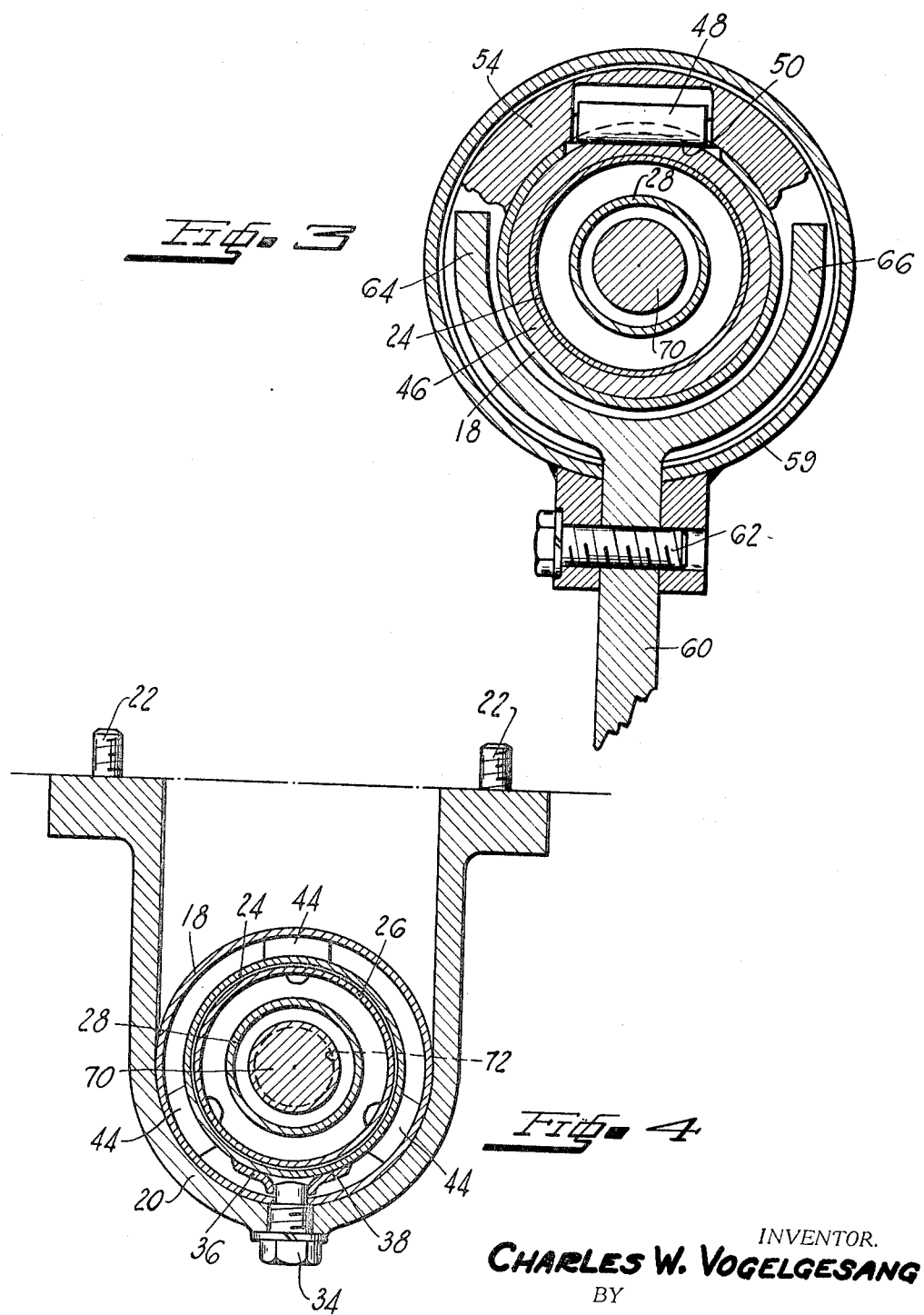

United States Patent Office 3,316,774
Patented May 2, 1967

3,316,774
ADJUSTABLE STEERING COLUMN
Charles W. Vogelgesang, South Bend, Ind., assignor to The Bendix Corporation, South Bend, Ind., a corporation of Delaware
Filed July 12, 1965, Ser. No. 471,148
4 Claims. (Cl. 74—493)

This invention relates to a steering mechanism of a motor vehicle and more particularly to an adjustable steering column.

The present practice in most vehicles is to provide an adjustable driver seat so that the most comfortable position relative to the accelerator, brake or other control pedals can be attained by the driver as determined by the length of his or her legs. However, if the steering column and wheel cannot also be adjusted, the position of the steering wheel will, more often than not, be incorrect. Thus, if a short driver adjusts the seat to a forward position so that the control pedals may be reached, the steering wheel probably will be too close to the driver's body and may even touch it. On the other hand, a tall driver who has moved the seat rearwardly may find that the steering wheel is too far away for comfort.

Accordingly, it is an object of this invention to provide an adjustable steering column which can be positioned relative to the driver's seat so that any normal driver, regardless of his girth, size or height will be comfortable and will have full control of the vehicle.

A further object of this invention is to provide an adjustable steering column which may be quickly adjusted by the driver in an easy manner.

Another object of this invention is to provide an axially adjustable steering column which is relatively simple in design and operation and eliminates hardware congestion and obstructions at the upper end of the column.

More specifically, it is an object of this invention to provide an axially adjustable steering column having a foot operated lock release control which permits the operator to keep both hands on the steering wheel at all times during axial adjustment of the steering column. Conventional hand operated levers do not permit this advantage.

A further object of this invention is to provide a locking mechanism at the lower end of an adjustable steering column which also serves as a bearing between the telescoping components thereof.

A still further object of this invention is to provide an adjustable steering column which can be adjusted at will by the driver while the vehicle is moving so as to minimize fatigue.

The above and other objects and features of this invention will become apparent from the following description of the mechanism taken in connection with the accompanying drawings which form a part of this disclosure and in which:

FIGURE 2 is an enlarged view partially in section of the lower portion of the steering column shown in FIGURE 1;

FIGURE 2A is an enlarged view partially in section of the upper portion of the steering column shown in FIGURE 1;

FIGURE 3 is a sectional view taken along line 3—3 of FIGURE 2; and

FIGURE 4 is a sectional view taken along line 4—4 of FIGURE 2A.

Figure 1:
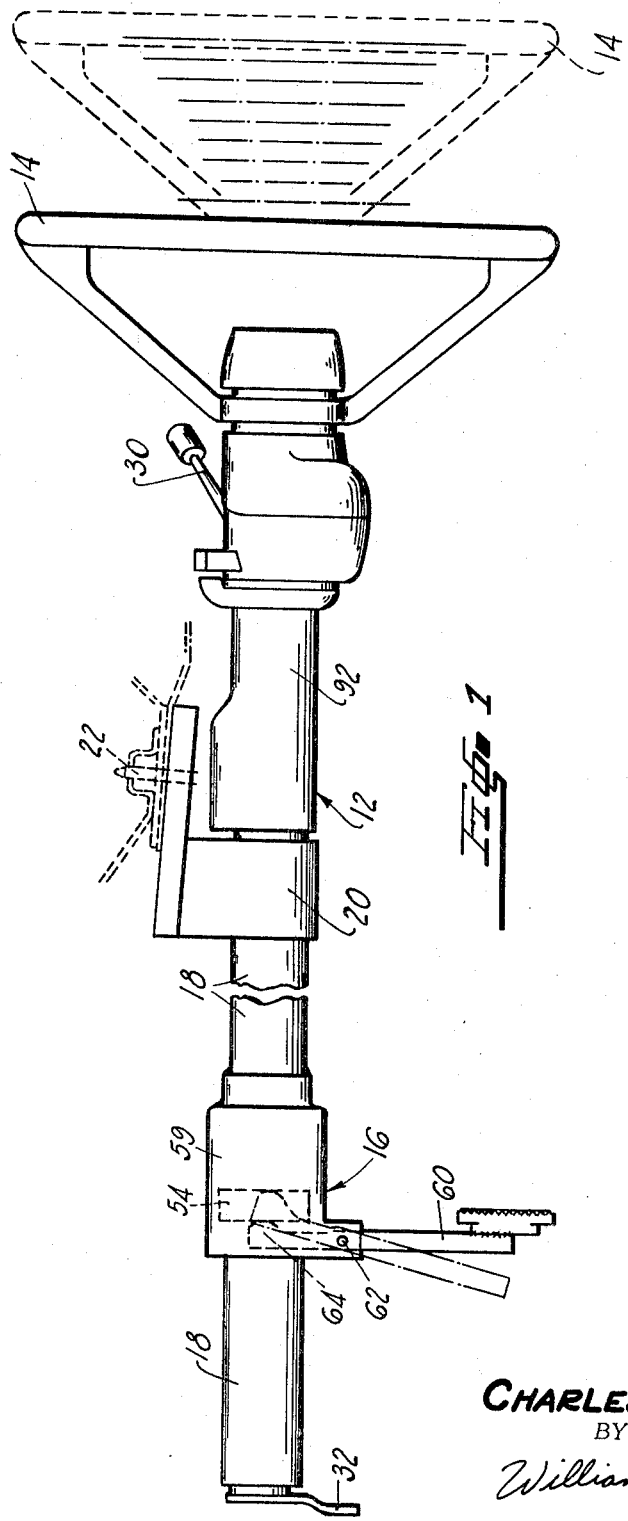
FIGURE 1 is a side elevation of the steering column and wheel which shows various axial positions of the steering wheel through use of dotted lines.

Referring to FIGURES 1 and 2 of the drawings, it will be seen that the steering column 12 and wheel 14 include a mechanism indicated generally by the numeral 16 for permitting axial adjustment of the steering column and wheel. This axial adjustment mechanism includes a plurality of concentric tubes, one of which is a stationary outer tube 18 that is attached to the frame of the vehicle through means of a U-shaped bracket 20 and bolts 22. Telescoped within the outer tube is an inner tube 24 which is axially movable with respect to the outer tube. Located within the inner tube are rotatable and axially movable gearshift tubes 26 and 28 which are suitably interconnected to each other and to gearshift lever 30 at the upper end and the gearshift control lever 32 at the lower end. Relative rotation between the outer tube 18 and inner tube 24 is prevented by a stationary bolt 34 which slides in a slot formed by brackets 36 and 38. Axial movement between the inner and outer tubes is limited by abutment of inner tube stops 40 and 42 with outer tube bolt 34. Three slipper type bearings 44 are located between the inner and outer tubes near the upper end thereof while maintaining these tubes in a concentric position.

A sleevelike member 46 is located between the outer and inner tubes near the lower end thereof and is welded to the inner member for axial movement therewith. The axial locking mechanism includes a cylindrical roller 48 which is located in a transverse slot 50 of the outer tube 18 for engagement with any one of a plurality of transverse grooves 52 formed on the surface of sleevelike member 46. The roller 48 is maintained in a given groove through means of a locking ring 54 which is urged towards its locking position by a compression spring 56. A ramp 58 formed on the inner surface of the ring 54 permits the roller 48 to move from one groove to the other, as desired, so long as the ring is moved against springs 56 to a nonlocking position. A shroud 59 is welded to the outer tube 18 and protects the locking mechanism. Movement of the ring 54 to a nonlocking position is accomplished through means of a foot operated lever 60 which is pivotally connected at 62 to the shroud 59 and outer tube 18, and abuts the ring 54 with forked ends 64 and 66. In order to prevent the cylindrical roller from falling out of the transverse slot 50 when the ring is moved to a nonlocking position, a pin 68 and light spring 69 are confined within the locking ring.

The steering shaft which is located within the inner tube 24 includes a first axially fixed component having a lower round section 70 and an upper rectangular section 72. A second axially movable steering shaft component 74 has a rectangular bore 76 for receiving and engaging the rectangular upper section 72 of the axially fixed shaft component. A second cylindrical roller 78 is located in a slot 80 of the hollow shaft 74 for frictional engagement with the surface of the rectangular shaft section 72. The roller 78 is maintained in such frictional engagement through means of a second ring 81 which has a tapered inner surface 82 in contact therewith. A spring 84 urges the ring in a direction tending to force the roller radially to eliminate torsional lash between the steering shaft components. The axially movable hollow shaft component 74 is operatively connected to the axially movable inner tube 24 through means of a bushing 86, which is welded to the hollow shaft component 74, and abutting bushings 88 and 90, the first of which is welded to the inner tube 24 and the second of which is welded to the gearshift tube 26. A shroud 92 is suitably connected to the inner tube 24 and surrounds the upper end of the steering column.

Axial adjustment of the steering column is controlled by movement of the foot operated lever 60 in the following manner. Upon application of pressure to the foot pedal, the lever 60 will pivot about point 62 and the forked ends 64 and 66 will cause the locking ring 54 to move in an upward direction against spring 56. Upon movement of the locking ring to a position which will permit the roller 48 to move out of its associated groove 52, the operator of the vehicle can move the hollow shaft component 74 and inner tube 24 axially with respect to the stationary lower shaft component and the stationary outer tube 18 simply by pulling or pushing on the steering wheel 14 with both hands. Upon release of pressure on the foot pedal, the locking ring 54 will return to its locking position and will force the roller 48 into one of the other grooves 52 to prevent further axial movement.

Angular adjustment of the steering column may be accomplished through use of a universal joint mechanism located at 94. Such a universal joint, although not shown in detail in this application, since it does not constitute a part of the invention, is described and claimed in Runkle application Ser. No. 304,551, filed on Aug. 26, 1963, now Patent No. 3,217,516.

The several practical advantages which flow from this type of an axially adjustable steering column arrangement are believed to be obvious from the above and other advantages may suggest themselves to those who are familiar with the art to which this invention relates.

Furthermore, although this invention has been described in connection with a specific embodiment, it will be obvious to those skilled in the art that various changes may be made in the form, structure and arrangement of parts without departing from the spirit of the invention. Accordingly, I do not desire to be limited to the specific embodiment disclosed herein primarily for purposes of illustration, but instead desire protection falling within the scope of the appended claims.

Having thus described the various features of the invention, what I claim as new and desire to secure by Letters Patent is:

1. In a motor vehicle, an axially adjustable steering column comprising an outer tubular member having a first transverse slot located in the wall thereof, said outer tubular member being rigidly connected to the frame of the vehicle, an inner tubular member axially movable with respect to said outer tubular member, means operatively connected to said outer and inner tubular members for preventing relative rotation therebetween, a sleevelike member having a plurality of axially spaced transverse grooves on the surface thereof and adjacent said first transverse slot, said sleevelike member being located between said outer and inner members and fixedly connected to the latter for axial movement therewith and bearing engagement with the former, a first cylindrical roller located in said first slot for engaging one of said grooves, a locking ring telescoped over said outer tubular member and movable axially with respect thereto, said locking ring having a first position for forcing said first roller into one of said grooves to thereby prevent axial movement between said inner and outer tubular members and a second position for permitting said first roller to move from one groove to another when the inner tubular member and sleevelike member are moved axially with respect to said outer tubular member, manually operated actuating means for causing movement of said locking ring from said first to said second position, first resilient means for returning said locking ring from said second to said first position, a first polygonal shaped steering shaft component located within said inner tubular member, a second steering shaft component telescoped over said first steering shaft component and movable axially with respect thereto, said second steering shaft component having a polygonal bore located therein for receiving and engaging said first steering shaft component to prevent relative rotation therebetween and a second transverse slot extending through the wall thereof, manually operable means operatively connected to said second steering shaft component for causing rotation thereof, a second cylindrical roller located in said second slot, a second ring telescoped over said second steering shaft component, said second ring having a tapered ramp on the inner surface thereof for engagement with said second roller, second resilient means for urging said ring in a direction tending to force said second roller radially to cause frictional engagement and elimination of torsional lash between said steering shaft components, and means operatively connected to said second steering shaft component and said inner tubular member for causing concomitant axial movement of said inner tubular member upon axial movement of said second shaft component but permitting relative rotation therebetween.

2. An axially adjustable steering column, as defined in claim 1, wherein third resilient means are located within said locking ring for maintaining said first cylindrical roller in said first slot.

3. An axially adjustable steering column, as defined in claim 2, wherein said third resilient means includes a spring and a pin, said pin being located betweeen and in contact with said spring and said first cylindrical roller.

4. An axially adjustable steering column, as defined in claim 3, wherein said manually operated actuating means includes a foot operated lever pivotally connected to said outer tubular member and in abutment with said locking ring.

References Cited by the Examiner

UNITED STATES PATENTS

| | | | |
|---|---|---|---|
| 1,101,552 | 6/1940 | Hume | 287—58 X |
| 2,744,419 | 5/1956 | Chayne | 74—493 |
| 2,800,190 | 7/1957 | Dvorak | 74—493 X |

FOREIGN PATENTS

| | | |
|---|---|---|
| 1,099,372 | 2/1961 | Germany. |
| 764,577 | 12/1956 | Great Britain. |
| 910,662 | 11/1962 | Great Britain. |

FRED C. MATTERN, Jr., *Primary Examiner.*

C. F. GREEN, *Assistant Examiner.*